United States Patent [19]

Mueller

[11] Patent Number: 4,656,889
[45] Date of Patent: Apr. 14, 1987

[54] TRANSMISSION SYSTEM WITH LAMELLA COUPLING FOR ALL WHEEL DRIVE VEHICLE

[75] Inventor: Robert Mueller, Moensheim, Fed. Rep. of Germany

[73] Assignee: Dr. Ing. H.c.F. Porsche Aktiengesellschaft, Fed. Rep. of Germany

[21] Appl. No.: 835,377

[22] Filed: Mar. 3, 1986

[30] Foreign Application Priority Data

Mar. 2, 1985 [DE] Fed. Rep. of Germany ....... 3507491

[51] Int. Cl.⁴ ..................... F16H 47/00; F16H 47/04; F16H 47/08
[52] U.S. Cl. ....................................... 74/718; 74/677; 180/248
[58] Field of Search ........................ 74/718, 720, 677; 180/247, 248

[56] References Cited

U.S. PATENT DOCUMENTS

| | | | |
|---|---|---|---|
| 2,949,047 | 8/1960 | Burckhardt | 74/720 X |
| 3,110,197 | 11/1963 | Prakash | 74/718 X |
| 4,373,604 | 2/1983 | Lunn et al. | 180/247 |
| 4,562,897 | 1/1986 | Renneker | 180/247 X |
| 4,601,359 | 7/1986 | Weismann et al. | 180/248 X |
| 4,605,087 | 8/1986 | Ashauer et al. | 180/248 |

FOREIGN PATENT DOCUMENTS 2135791 2/1972 Fed. Rep. of Germany.

Primary Examiner—Leslie Braun
Assistant Examiner—Dirk Wright
Attorney, Agent, or Firm—Barnes & Thornburg

[57] ABSTRACT

An arrangement for a four wheel drive motor vehicle which increases the rotational moment transfer from the front axle to the rear axle in the case of a large rotational speed differential between the two axles. The arrangement includes a lamella or plate clutch arranged between the front axle and the rear axle. The front axle is directly driven by the gear change transmission and the rear axle is indirectly driven by the front axle. A one way clutch and a reducing transmission are interposed with respect to the plate clutch in such a way that the characteristic curve for rotational moment transfer versus axle rotational speed differential exhibits a flat slope during normal driving conditions (relatively small speed differentials) and an increasingly steep slope during hazardous driving conditions (relatively large speed differentials).

23 Claims, 4 Drawing Figures

TRANSMISSION SYSTEM WITH LAMELLA COUPLING FOR ALL WHEEL DRIVE VEHICLE

BACKGROUND AND SUMMARY OF THE INVENTION

The invention relates to a four wheel drive for a motor vehicle having a plate clutch arranged in between the front and rear axles, wherein inner clutch plates transfer increasing rotational moment to the outer clutch plates in dependence upon increasing rotational speed differences between the front and rear axles. A four wheel drive is described in German Published Unexamined Application (DE-OS) No. 21 35 791 in which a viscous lamella or plate clutch is built into the drive train. By means of different rotational speeds of the clutch plates, a rotational moment is effected via the shearing effect on the fluid in the clutch, which rotational moment is transferred to the axle (rear) which is not directly driven by the gear change transmission.

It is a disadvantage of the known art that the characteristic curve of the rotational moment with respect to the rotational speed difference has an upward but decreasing slope and not, as would be desired, an upward and increasing slope as does for example, the curve of a quadratic equation.

The most extreme loading of a viscous clutch of this type occurs in motor vehicles with front wheel drive when the directly driven front axle slips on very slick surfaces, for example, ice, and the rear axle is still on dry road. Under this condition, the front axle has a high rotational speed and the rear axle has a relatively low rotational speed, resulting in a large speed differential between the two axles.

Because a clutch of the type described above can transfer in the first gear the full motor load, that is, the full rotational moment, it is necessary to have a very steep characteristic curve depicting the moment transferred versus the axle speed differential. This steep slope, which represents an ability of the arrangement to transfer a large moment from the front axle to the rear axle at increasing speed differentials between the two axles, is necessary under driving conditions which create large speed differentials (such as occur in the above example) in order to avoid burning out the clutch.

If the characteristic line has too flat a slope, under conditions where the speed differential between the axles is very great, a "soft" viscous plate clutch results. In this case, the motor load is not transferred to the rear axle, resulting in a warming up of the clutch, which after a short time leads to an overheating and destruction of the clutch.

A steep characteristic curve at all speed differentials, however, is very disadvantageous as it corresponds to a reduction in precision steering. For example, driving into parking places is difficult because it is difficult to make sharp turns.

It is an objective of the invention to construct a four wheel drive with a plate clutch arrangement so that on the one hand, good driving handling is available for snow and ice, especially for driving around curves, and on the other hand, the full motor load is transferred to the not directly driven (rear) axle under certain hazardous driving conditions, at least for a limited time period.

To achieve this objective, a one way clutch and a reducing transmission are arranged to engage certain plates of the plate clutch at a predetermined axle speed differential. Where the plate clutch, which according to preferred embodiments is constructed as a viscous clutch having inner and outer plates, has a reducing transmission arranged in between it and the front axle, and wherein the plate clutch is connected to the reducing transmission by means of a one way clutch, a stepped rotational moment versus rotational speed differential characteristic curve results. The curve exhibits both a relatively flat upwardly sloping portion and a steeper upwardly sloping portion.

According to preferred embodiments of the invention, one group of inner clutch plates are rotationally fixed directly to the driving shaft and the other group of inner clutch plates are connected with the driving shaft via a one way clutch and a reducing transmission. The outer clutch plates are fixed to the clutch housing, which in turn, is connected to the rear axle. At relatively low speed differentials, only the inner clutch plates that are directly connected with the driving shaft are engaged to transfer the rotational moment to the outer clutch plates and, thus, the rear axle. At these rotational speed differentials the clutch operates along the relatively flat upwardly sloped portion of the characteristic curve.

Once the rotational speed difference reaches a certain predetermined value, however, the one way clutch engages to assist in the rotational moment transfer. Through the one way clutch, which is driven by the reducing transmission, the remaining inner clutch plates are engaged in the arrangement. When these remaining inner clutch plates are engaged, corresponding to an increasing rotational speed difference, the clutch functions in the steeply sloping portion of the characteristic curve. The predetermined switching point can be fixed by selection of a particular gear ratio and reducing gear transmission. In this manner, one can achieve a desired progressive overall characteristic line.

According to other preferred embodiments of the invention, all of the inner clutch plates are directly fixedly connected with the driving shaft from the front axle. In this embodiment the clutch exhibits a relatively flat upwardly sloping curve over a very broad spectrum of the rotational speed differences. After a predetermined rotational speed difference is reached, this curve extends vertically so that full slip differential transfer is achieved from the front axle to the rear axle.

Other objects, advantages and novel features of the present invention will become apparent from the following detailed description of the invention when considered in conjunction with the accompanying drawings.

DETAILED DESCRIPTION OF THE DRAWINGS

Figure 1:
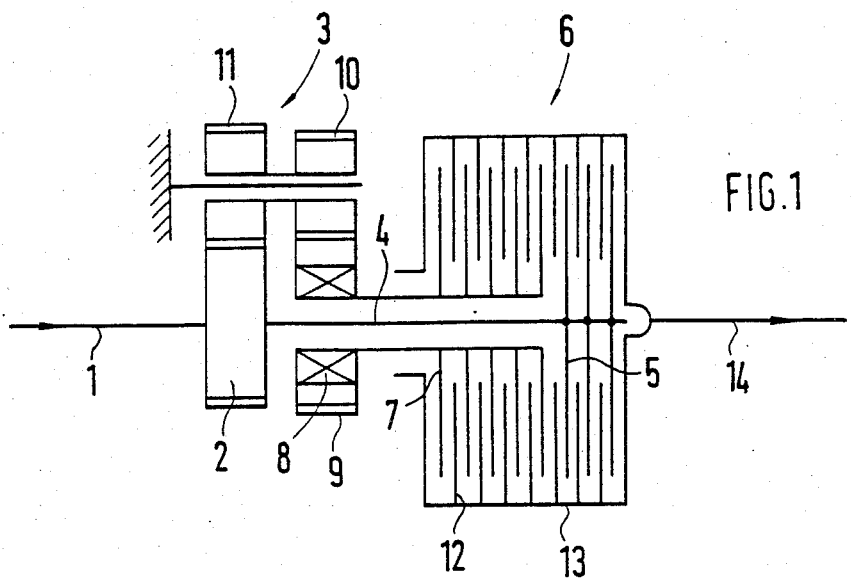
FIG. 1 depicts a four wheel drive constructed in accordance with preferred embodiments of the invention, having a two step viscous clutch.
Figure 3:
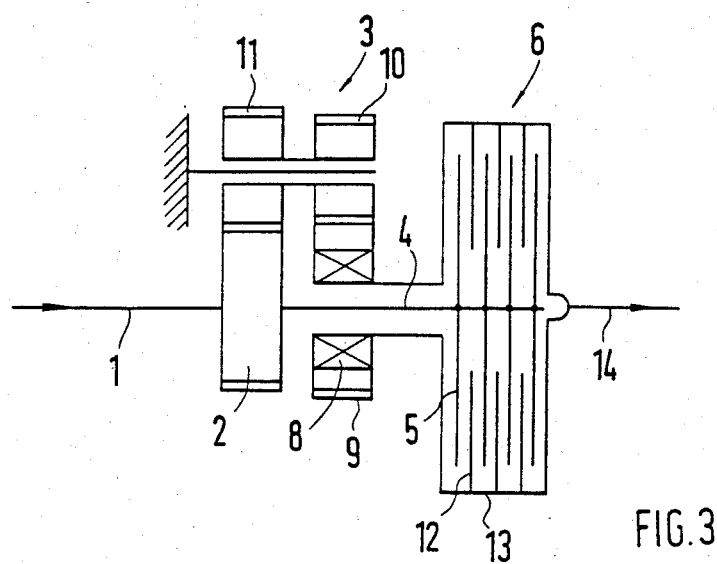
FIG. 3 depicts a four wheel drive constructed in accordance with another preferred embodiment of the invention having full slip transfer of the rotational moment at a predetermined speed differential.

FIGS. 1 and 3 depict a two step viscous clutch for a four wheel drive vehicle. According to the figures, the front axle is directly driven by the gear change transmission. From the front axle a driving wheel 1 leads to an inlet gear wheel 2 of a reducing transmission 3. A coaxially extending central shaft 4 is fastened on the inlet gear wheel 2, which central shaft carries the inside or inner clutch plates or lamella 5 of a viscous fluid clutch 6.

According to the preferred embodiment shown in FIG. 1, the other inner clutch plates 7 are fixedly connected with a one way clutch 8, the outer gear wheel 9 of which interengages with toothed gear wheel 10 of the reducing transmission 3. Gear wheel 10 together with a further gear wheel 11 is disposed on a bearing support shaft 15 extending parallel to the central shaft 4 and driven by the inlet gear wheel 2.

Between the inner clutch plates 5 and 7, outer clutch plates 12 are disposed that are arranged at a clutch housing 13 which is filled with fluid of high viscosity. Via slippage between the inner clutch plates and the outer clutch plates, rotational moment will be transferred to the driving shaft 14 for the rear axle by means of the clutch housing 13.

Figure 2:
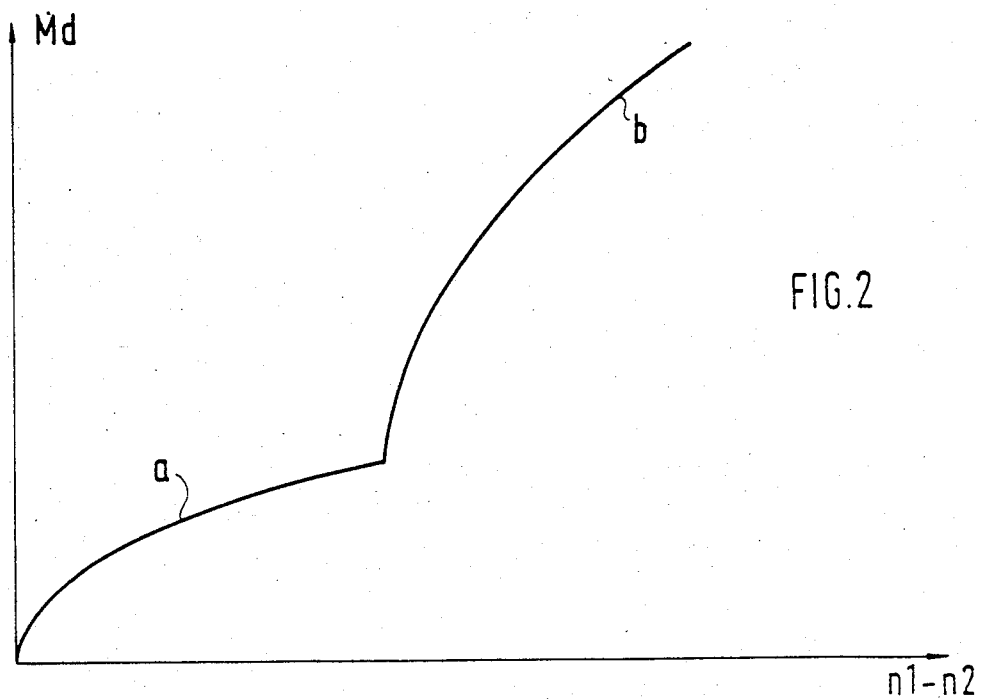
FIG. 2 is a graph charting rotational moment versus rotational speed differential for a four wheel drive constructed in accordance with the preferred embodiment of the invention depicted in FIG. 1.

When the rotational speed difference (n1−n2) between the front (n1) and rear (n2) axle is small, the viscous clutch has a characteristic curve corresponding to the curve branch "a" shown in FIG. 2. This portion of the characteristic curve represents the moment transfer occurring during normal street and driving conditions. At the relatively flat portion of the upwardly sloping curve, the inner clutch plates 7 are not operatively connected by the one way clutch and carry none of the rotational moment. For the values of n1-n2 greater than a predetermined amount, the one way clutch engages the inside clutch plates 7 and through them transfers a greater portion of the increasing rotational moment to the rear axle. This engagement of clutch plates 7 results in a sharp increase of the rotational moment transferred with respect to rotational speed, resulting in the steeper characteristic curve represented by the curve branch "b".

Figure 4:
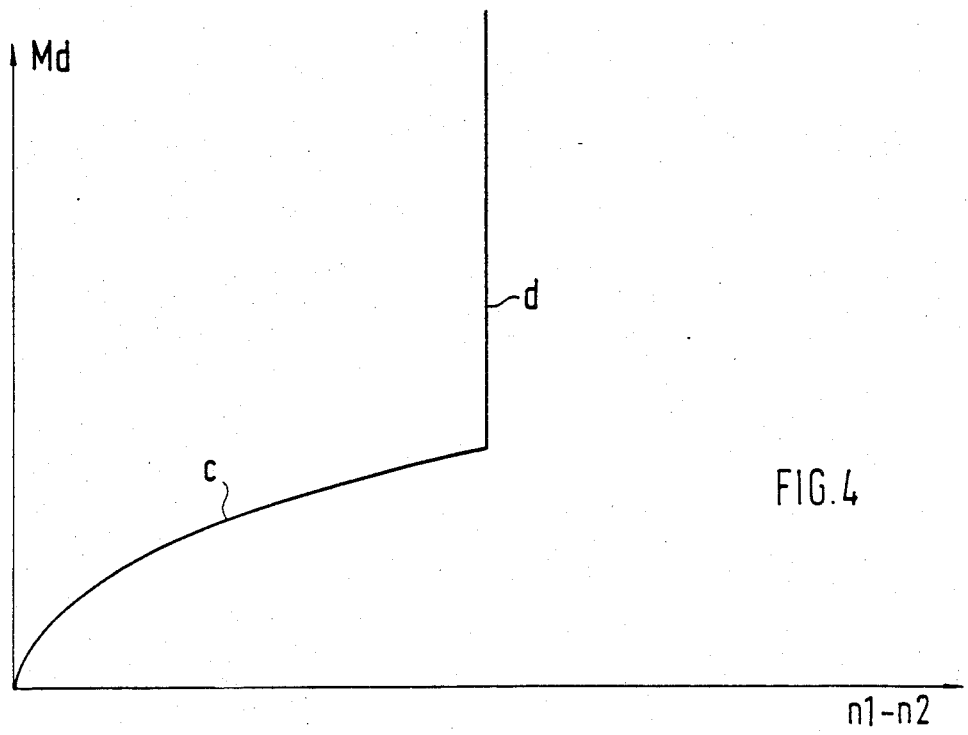
FIG. 4 is a graph charting rotational moment versus rotational speed differential for a four wheel drive constructed in accordance with the preferred embodiment of the invention depicted in FIG. 3.

According to another preferred embodiment of the invention, depicted in FIG. 3, all of the inner clutch plates 5 are arranged on the central shaft 4. As shown in FIG. 4, this arrangement results in a relatively flat upwardly sloping characteristic curve "c" which then goes into a vertical curve "d" with a comparatively high slip value at a predetermined rotational speed differential. The point at which the characteristic curve becomes vertical corresponds to the point at which the one way clutch engages the inner clutch plates 5. The need for the arrangement depicted in FIG. 3 may arise during extreme driving conditions, for example, when driving on snow after being parked for a long period, or when driving up a mountain with a trailer, or when snow chains are installed on the rear wheels.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. An arrangement for a four wheel drive motor vehicle positioned between a front and a rear axle comprising:
    a plate clutch means for transferring a rotational moment from said front to said rear axle, a portion of said plate clutch means being fixedly connected to said front axle,
    connecting means for engaging another portion of said plate clutch means with said front axle at a predetermined rotational speed differential between said front and rear axle,
    wherein at said predetermined rotational speed differential, the rotational moment transferred from the front to the rear axle with respect to the rotational speed differential increases sharply.

2. An arrangement according to claim 1, wherein a characteristic curve for the moment transferred with respect to the rotational speed differential exhibits a steeper positive slope at speed differentials equal to or greater than said predetermined rotational speed differential.

3. An arrangement according to claim 2, wherein said plate clutch means comprises inner plate clutch means and outer plate clutch means, one of said plate clutch means operating to transfer said rotational moment to the other of said plate clutch means, the other of said plate clutch means being fixedly connected to said rear axle.

4. An arrangement according to claim 3, wherein one of said plate clutch means comprises said inner plate clutch means and the other of said plate clutch means comprise said outerplate clutch means.

5. An arrangement according to claim 4, wherein said inner plate clutch means comprises a first inner plate clutch means and a second inner plate clutch means, said first inner plate clutch means being fixedly connected to said front axle.

6. An arrangement according to claim 5, wherein said second inner plate clutch means is configured to become operative only at said predetermined rotational speed differential between said front and rear axle.

7. An arrangement according to claim 6, wherein said connecting means comprises a reducing transmission means and a one way clutch means.

8. An arrangement according to claim 7, said second inner plate clutch means being fixedly attached to said one way clutch means, said one way clutch being drivingly connected to said front axle via said reducing transmission means.

9. An arrangement according to claim 8, wherein said second inner plate clutch means becomes drivingly connected to said front axle only at said predetermined rotational speed differential between said front and rear axle.

10. An arrangement according to claim 9, wherein said inlet gear wheel is fixedly connected to said first inner plate clutch means via a central shaft means.

11. An arrangement according to claim 10, wherein said inner plate clutch means and said outer plate clutch means are contained by a clutch housing means filled with a viscous fluid.

12. An arrangement according to claim 11, wherein said outer plate clutch means are fixedly connected to said rear axle via said clutch housing means.

13. An arrangement according to claim 12, wherein said rotational moment transfer occurs by means of a shearing force transfer of the fluid between the inner plate clutch means and the outer plate clutch means in response to the rotational speed differential between the front and rear axle.

14. An arrangement according to claim 13, wherein said rotational moment transfer occurs by means of a mechanical friction between abutting inner plate clutch means and outer plate clutch means.

15. An arrangement according to claim 4, wherein said inner plate clutch means are fixedly connected to said front axle.

16. An arrangement according to claim 15, further comprising a clutch housing means for containing said inner and outer plate clutch means and filled with a viscous liquid, said one way clutch means being fixedly connected to said outer plate clutch means and said rear axle via said clutch housing means.

17. An arrangement according to claim 16, wherein said outer plate clutch means becomes drivingly connected to said front axle at said predetermined rotational speed differential between said front and rear axle.

18. An arrangement according to claim 16, wherein said inner plate clutch means are fixedly connected to said front axle via a central shaft means said central shaft means being fixedly connected to an inlet gear wheel of said reducing transmission, said inlet wheel being fixedly connected to a driving wheel of said front axle.

19. An arrangement according to claim 18, wherein said inner plate clutch means rotates with said inlet gear wheel.

20. An arrangement according to claim 19, wherein said one way clutch is connected with said clutch housing.

21. An arrangement according to claim 14, wherein said one way clutch means includes a toothed wheel means; and
wherein said reducing transmissions means comprises:
a toothed inlet gearwheel means for transmitting said rotational moment from the front axle,
a pair of toothed gear wheel means having fewer teeth than said toothed inlet gear for engaging said toothed inlet gear and arranged on an axis parallel to said central shaft on which said toothed inlet gear is arranged, one of said pair of toothed gear wheel means engaging said toothed wheel means of said one way clutch means.

22. An arrangement according claim 17, wherein said inner plate clutch means and said outer plate clutch means are contained by a clutch housing means filled with a viscous fluid.

23. An arrangement according to claim 22, wherein said rotational moment transfer occurs by means of a shearing force transfer of the fluid between the inner plate clutch means and the outer plate clutch means in response to the rotational speed differential between the front and rear axle.

* * * * *